United States Patent
Parker

(10) Patent No.: US 9,838,742 B2
(45) Date of Patent: Dec. 5, 2017

(54) ENHANCED PROGRAM GUIDE

(71) Applicant: EchoStar Technologies L.L.C., Englewood, CO (US)

(72) Inventor: Scott Parker, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/697,325

(22) Filed: Apr. 27, 2015

(65) Prior Publication Data

US 2016/0316269 A1    Oct. 27, 2016

(51) Int. Cl.
| | |
|---|---|
| *H04N 5/445* | (2011.01) |
| *H04N 21/466* | (2011.01) |
| *H04N 21/442* | (2011.01) |
| *H04N 21/25* | (2011.01) |
| *H04N 21/482* | (2011.01) |

(52) U.S. Cl.
CPC ....... *H04N 21/4667* (2013.01); *H04N 21/251* (2013.01); *H04N 21/44204* (2013.01); *H04N 21/482* (2013.01)

(58) Field of Classification Search
CPC ....... H04N 21/44222; H04N 21/44213; H04N 21/482; H04N 21/4826
See application file for complete search history.

(56) References Cited

U.S. PATENT DOCUMENTS

| | | | |
|---|---|---|---|
| 6,177,931 B1* | 1/2001 | Alexander | G06Q 30/0269 348/565 |
| 6,774,926 B1* | 8/2004 | Ellis | H04N 5/44543 348/14.01 |
| 2002/0112249 A1* | 8/2002 | Hendricks | H04H 20/10 725/136 |
| 2002/0175953 A1* | 11/2002 | Lin | H04N 21/42204 715/811 |
| 2002/0188948 A1* | 12/2002 | Florence | H04N 5/44543 725/46 |
| 2003/0117445 A1* | 6/2003 | Hendricks | H04H 20/91 715/810 |
| 2004/0255336 A1* | 12/2004 | Logan | H04H 20/28 725/135 |
| 2005/0278741 A1* | 12/2005 | Robarts | H04N 5/44543 725/46 |
| 2006/0123449 A1* | 6/2006 | Ma | G06K 9/222 725/58 |
| 2006/0143651 A1* | 6/2006 | Kim | H04N 5/445 725/39 |

(Continued)

*Primary Examiner* — Pankaj Kumar
*Assistant Examiner* — Timothy Newlin
(74) *Attorney, Agent, or Firm* — Kilpatrick Townsend & Stockton, LLP

(57) ABSTRACT

Systems and methods for producing and displaying an enhanced program guide may include a method including identifying each channel viewed by a user over a period of time at an electronic device. The method may include storing data associated with each channel viewed, and may include producing a list of each channel viewed with the electronic device. The produced list may be ordered from most watched channel to least watched channel. The method may also include receiving a command at the electronic device to display an electronic program guide, and may still include incorporating at least a portion of the list into the electronic program guide at the electronic device for display.

20 Claims, 6 Drawing Sheets

(56) References Cited

U.S. PATENT DOCUMENTS

| | | | |
|---|---|---|---|
| 2007/0136757 A1* | 6/2007 | Cormack | H04N 5/44543 725/47 |
| 2008/0229359 A1* | 9/2008 | Robinson | H04N 5/44543 725/46 |
| 2008/0276277 A1* | 11/2008 | Ahn | H04N 5/44543 725/40 |
| 2011/0088057 A1* | 4/2011 | Udani | G06Q 30/02 725/32 |
| 2011/0119713 A1* | 5/2011 | Chang | H04N 21/4126 725/46 |
| 2014/0053180 A1* | 2/2014 | Shoykher | H04N 5/44 725/14 |
| 2014/0137158 A1* | 5/2014 | Kannan | H04N 21/435 725/54 |
| 2014/0189743 A1* | 7/2014 | Kennedy | H04N 21/84 725/46 |
| 2014/0337869 A1* | 11/2014 | Faulkner | H04N 21/44222 725/14 |
| 2015/0113548 A1* | 4/2015 | Stern | H04N 21/4826 725/9 |
| 2015/0334458 A1* | 11/2015 | Srinivasan | H04N 21/44222 725/14 |

\* cited by examiner

|          |     | 11:00 PM | 12:00 AM | 1:00 AM | 2:00 AM | 3:00 AM |
|----------|-----|----------|----------|---------|---------|---------|
| Entry 1  | 118 | The Life of Winston Churchill ||| Paid Programming ||
| Entry 2  | 110 | Cooking with Celebrities ||| Samurai Cook-Off ||
| Entry 3  | 107 | Not News | Comedy Roast | Stand-up Live |||
| Entry 4  | XXX | On-Demand Programming for User Selection |||||
| Entry 5  | XXX | New Episode of Celebrity Chop Available |||| Vampire Drama |
| Entry 6  | 300 | Horrible Drama and Murder ||| News Commentary ||
| Entry 7  | 200 | Newshow at 11:00 |||| News |

FIG. 4

ENHANCED PROGRAM GUIDE

TECHNICAL FIELD

The present technology relates to systems and methods for producing electronic program guides. More specifically, the present technology relates to providing an electronic program guide including most-watched channels of a viewer.

BACKGROUND

As cable and satellite broadcast companies include greater numbers of channels in their lineups, navigating those lineups can be cumbersome for a user. Channel lineups may include hundreds of channels that are typically navigated by rudimentary controls allowing a user to type in specific numbers, or increase and decrease channels by one channel or a small page of channels at a time. This may result in frustration for viewers wishing to be able to see frequented channels without having to traverse dozens or more screens to access the guide information for their intended channels.

Thus, there is a need for improved methods and systems producing and providing electronic programming guides. These and other needs are addressed by the present technology.

SUMMARY

Systems and methods for producing and displaying an enhanced program guide may include a method including identifying each channel viewed by a user over a period of time at an electronic device. The method may include storing data associated with each channel viewed, and may include producing a list of each channel viewed with the electronic device. The produced list may be ordered from most watched channel to least watched channel. The method may also include receiving a command at the electronic device to display an electronic program guide, and may still include incorporating at least a portion of the list into the electronic program guide at the electronic device for display.

The method may include transmitting from the electronic device the electronic program guide for display on a communicatively coupled display device. In embodiments, the user may be one of a plurality of users recognized by the device, and the list may be a user list produced for that user based on channels viewed by that user. The period of time may be any rolling or measured time back to the date the device initiates operation, and may include weeks, such as four weeks, for example. The list may include access to on-demand programming or user selectable channels in embodiments. In embodiments, the list order may be based on the number of times during the period of time that each channel was accessed, and the list order may also be based on the cumulative amount of time during the period of time that each channel was accessed.

The method may also include accessing the list to retrieve at least a subset of the most-watched channels on the list, and accessing an electronic program guide data table to retrieve information regarding channels including the list channels retrieved. The electronic program guide may include any number of entries per page, such as at least four entries per screen for display, and in embodiments at least half but not all of the entries may include channels from the list. The method may still also include receiving at the electronic device a second command to shift displayed entries of the electronic program guide while a cursor is positioned on one of the list channels, and in response the electronic device may adjust the list entries on the electronic program guide while maintaining the other entries on the electronic program guide. In embodiments, the electronic program guide may include a selection for a user to adjust the electronic program guide from displaying list channels to displaying a standard channel order. Additionally, the list may include at least one channel selected by the user to be maintained in the list regardless of the amount the channel is watched.

The present technology additionally includes electronic devices including at least one input component configured to receive audiovisual content and at least one output component communicatively coupled with at least one display device. The devices may include one or more processors, and memory communicatively coupled with and readable by the one or more processors and having stored therein processor-readable instructions, which when executed by the one or more processors cause the one or more processors to perform certain operations. The operations may include identifying each channel viewed by a user over a period of time, and storing data associated with each channel viewed. The operations may also include producing a list of channels utilizing the stored data, where the list may be ordered from most watched channel to least watched channel, and receiving a command to display an electronic program guide. The operations may still include incorporating at least a portion of the list into the electronic program guide for display, and in embodiments may include transmitting the electronic program guide for display on the at least one display device. In embodiments, the list order may be based on the number of times during the period of time that each channel was accessed, and less than, about, or at least five channels of the list may be incorporated into the electronic program guide.

The present technology also includes a computer-readable medium, which may be non-transitory, with sets of instructions thereon, which when executed by a processor cause the processor to perform operations. The operations may include identifying each channel viewed by a user over a period of time, and storing data associated with each channel viewed. The operations may also include producing a list of channels utilizing the stored data, where the list may be ordered from most watched channel to least watched channel, and receiving a command to display an electronic program guide. The operations may still include incorporating at least a portion of the list into the electronic program guide for display, and in embodiments may include transmitting the electronic program guide for display on the at least one display device. In embodiments, the list may include at least one channel selected by the user to be maintained in the list regardless of the amount the channel is watched. Also in embodiments, the electronic program guide may include a selection for a user to adjust the electronic program guide to include one or more channels from the list, current channels, or user-selectable channels.

Such technology may provide numerous benefits over conventional techniques. For example, a user who tends to watch a small subset of channels can conveniently monitor each of those channels with a small number of screen adjustments. Additionally, by providing users with options for manipulating the included channels in the program guide, a user can monitor favorite channels as well as those surrounding the channels currently being watched. This may reduce user frustration with having to scroll hundreds of channels at a time, and from having to make a favorites list that needs to be updates all the time with new added channels. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIG. 4 shows a simplified electronic program guide according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to producing electronic program guides that include a selection of a user's most frequented channels. In so doing, users may monitor their favorite few channels regardless of those channels' location in a conventional electronic program guide. This may prevent or reduce user frustration associated with adjusting channels in small blocks across hundreds of channels in a lineup. These and other benefits will be explained in detail below.

Although embodiments detailed herein are directed toward controlling television based equipment, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audiovideo content, such as on-demand video content, on-demand or streaming audio content, streaming video content and the like delivered via any type of content delivery systems, such as cable, satellite, cellular/wireless, terrestrial broadcast, Internet/IP, and/or any other content delivery technology or system currently known or hereafter developed. Furthermore, embodiments herein describe set-top boxes or receivers and/or other devices being connected with a television or other device having an electronic display. However, the electronic device can also be incorporated into or be a part of the device having the display or display device, such as a television with an integrated cable, satellite, terrestrial, or IPTV receiver. Alternatively, the electronic device may be a DVR or DVD player including the present technology. The technology discussed herein additionally can be extended to any of a variety of other electronic devices, display devices, or combined devices, such as, for example, computers, tablets, hand-held mobile devices, cell phones, e-readers, personal media players, and the like. A person of ordinary skill in the art will recognize various alterations, additions, omissions, and substitutions.

Figure 1:
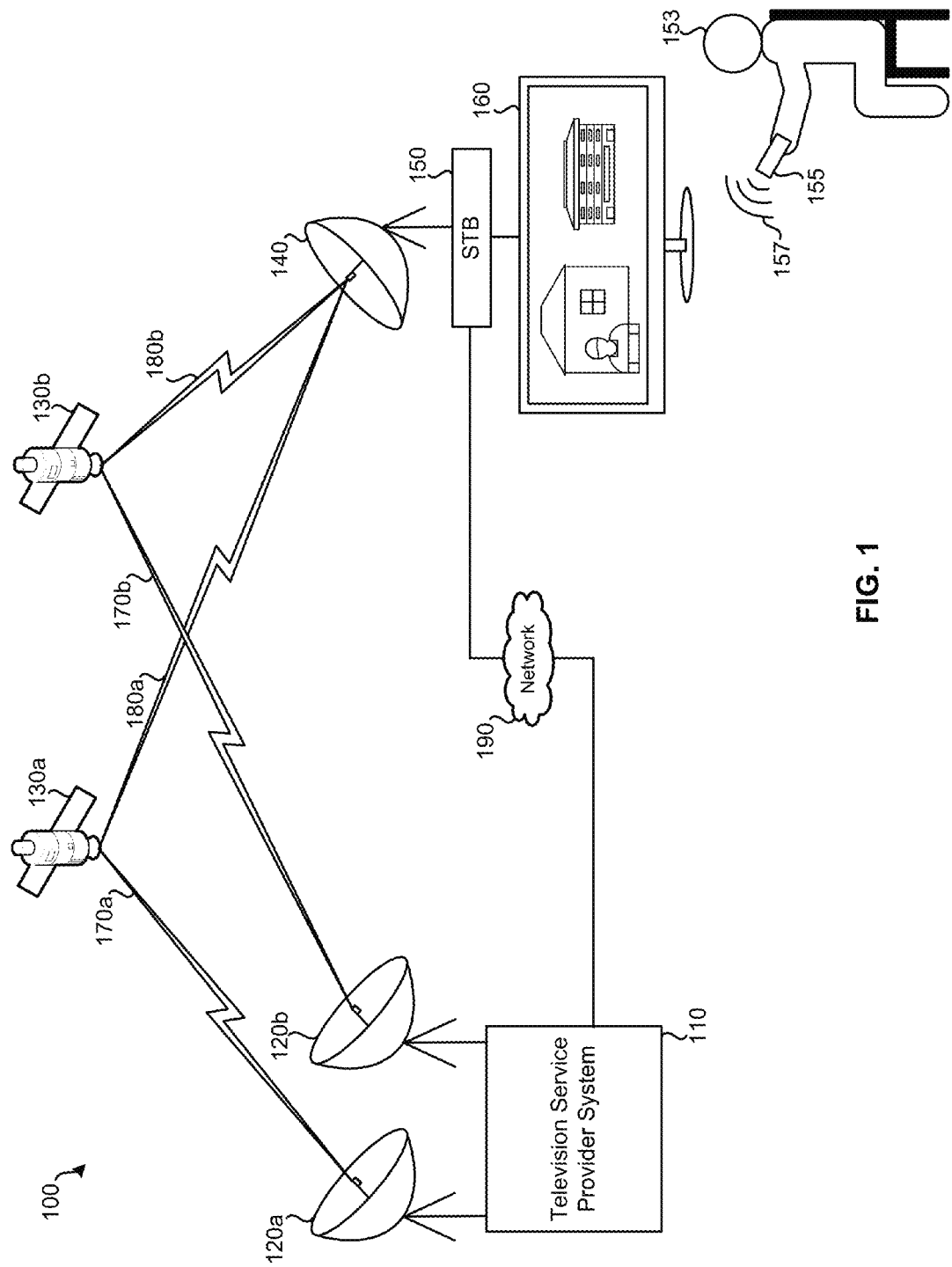
FIG. 1 shows a simplified media service system that may be used in accordance with embodiments of the present technology.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Although discussed as being wireless for user convenience, the technology may additionally include a wired coupling between the remote control device 155 and STB 150 or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programing, programming information, and/or other services to users. Television service provider system 110 may receive feeds of one or more television channels or audio channels from various sources. Such television channels may include multiple television channels that contain the same content, but may be in different formats, such as high-definition and standard-definition. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120, and/or other satellite transmitter equipment, to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130a. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
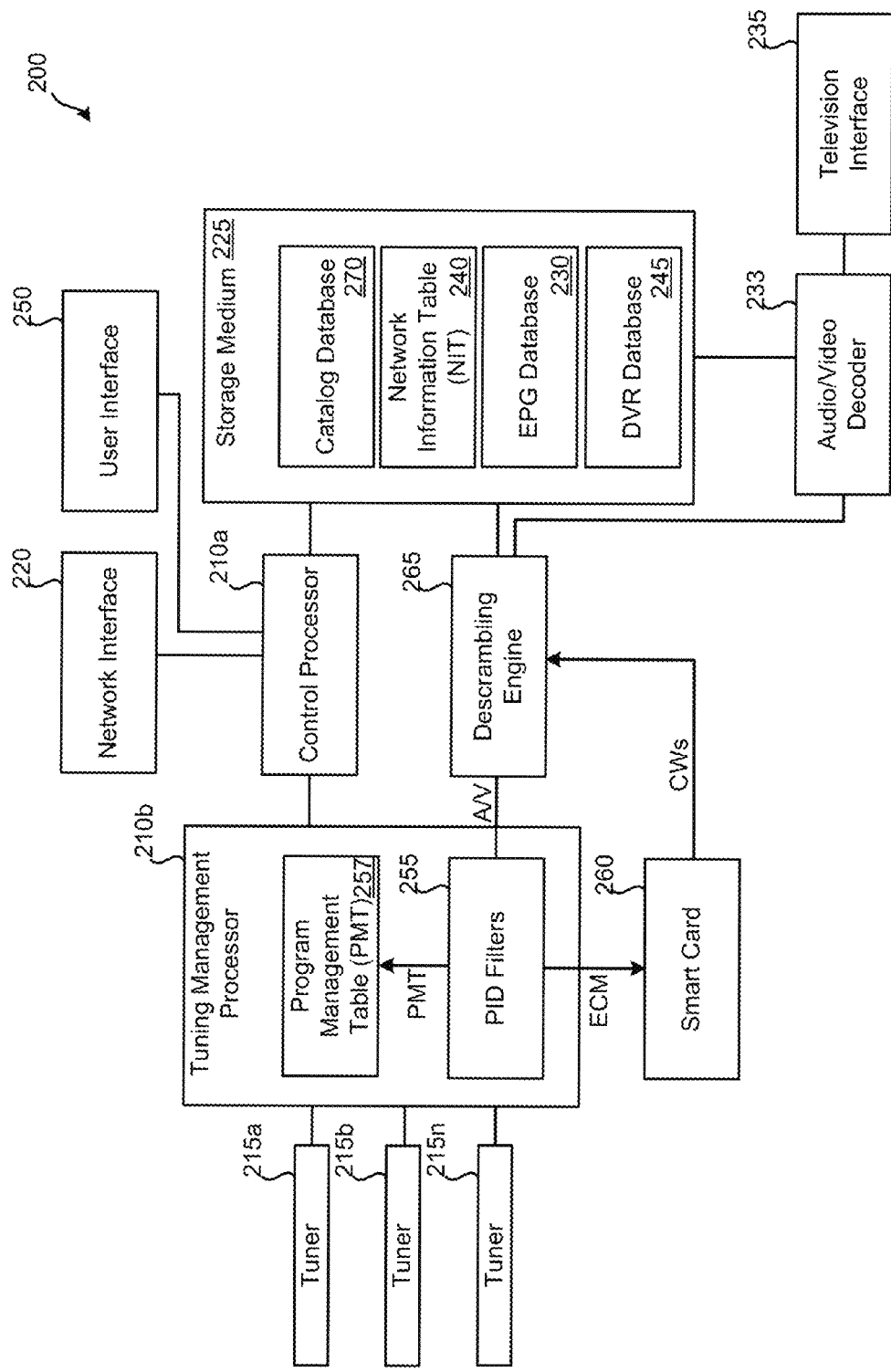
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170a represents a signal between satellite uplink 120a and satellite 130a. Uplink signal 170b represents a signal between satellite uplink 120b and satellite 130b. Each of uplink signals 170 may contain streams of one or more different television channels. For example, uplink signal 170a may contain a certain group of television channels, while uplink signal 170b contains a different grouping of television channels. Each of these television channels may be scrambled such that unauthorized persons are prevented from accessing the television channels.

Transponder stream 180a represents a signal between satellite 130a and satellite dish 140. Transponder stream 180b represents a signal path between satellite 130b and satellite dish 140. Each of transponder streams 180 may contain one or more different television channels in the form of transponder streams, which may be at least partially scrambled. For example, transponder stream 180a may include a first transponder stream containing a first group of television channels, while transponder stream 180b may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180a and transponder stream 180b being received by satellite dish 140. For a first group of television channels, satellite dish 140 may receive a transponder stream of transponder stream 180a; for a second group of channels, a transponder stream of transponder stream 180b may be received. STB 150 may decode the received transponder stream. As such, depending on which television channel(s) are desired, a transponder stream from a different satellite, or a different transponder of the same satellite, may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates an embodiment of a television receiver 200, in accordance with certain embodiments of the present disclosure. The television receiver 200 may correspond to the television receiver or set-top box (STB) 150 of FIG. 1. In some embodiments, the receiver 200 may include more or less functionality as compared to the STB 150, and may depend at least to a certain degree on receiver to implement certain features or functionality.

Television receiver 200 may be in the form of a separate device configured to be connected with one or more display devices, such as televisions 160. Embodiments of television receiver 200 can include set top boxes (STBs). In addition to being in the form of an STB, a television receiver may be incorporated as part of another device, such as a television, other form of display device, video game console, computer, mobile phone, tablet, or the like. For example, a television may have an integrated television receiver, which does not involve an external STB being coupled with the television.

Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 270, remote control interface or user interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210b may control how many video streams are provided to individual display devices, which may be defined based on user preferences. Control processor 210a may also communicate with network interface 220 and remote control interface 250. Control processor 210a may handle incoming data from network interface 220 and remote control interface 250. Additionally, control processor 210a may be configured to output data via network interface 220.

Tuners 215 may include one or more tuners used to tune to transponders that include broadcasts of one or more television channels. In some embodiments, two, three, or more than three tuners may be present, such as four, six, or eight tuners or more. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. In disclosed embodiments, tuner 215 may include a full-band tuner configured to receive the whole broadcast band on a single tuner. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to tune to certain frequencies. In some embodiments, the key combination database and/or remote control lock rules are stored and processed by the remote control.

Network interface 220 may be used to communicate via an alternate communication channel with a television service provider, if such communication channel is available. The primary communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. In disclosed embodiments, television programs may be received directly over network interface 220, along with information regarding included advertisements as discussed more thoroughly below. Information may be transmitted and/or received via network interface 220. For instance, instructions from a television service provider may also be received via network interface 220, if connected with the Internet. Network interface 220 may also be used to communicate with mobile devices of users, via a local wireless network, the Internet, and/or a cellular network.

Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 270. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command.

The network information table (NIT) 240 may store information used by television receiver 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by television receiver 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to look up the audio PIDs and video PIDs in another table, such as a program management table (PMT). For example, a program management table (PMT) may store information on audio PIDs and video PIDs for television channels that are transmitted on a transponder frequency.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 270 and/or information from EPG database 230, to a television for presentation. Television interface 235 may also serve to output a CVM. Television interface 235 may be configured to be connected with multiple display devices. Therefore, different video feeds may be presented via different display devices. Television interface 235 may also be configured to output multiple, e.g., 3, 3, 4, 5, 6, etc., video streams to a single display device for simultaneous presentation.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite. Content from DVR database 245 may be output as a video stream to a display device. A particular user may issue commands indicating that recorded content be presented.

As an example of DVR functionality of television receiver 200 being used to record based on provider-defined timers, a television service provider may configure television receiver 200 to record television programming on multiple, predefined television channels for a predefined period of time, on predefined dates. Channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time, beyond the time which the predefined recording would otherwise be saved. Television programming recorded based on provider-defined timers may be stored to a portion of storage medium 225 for provider-managed television programming storage.

User interface 250 may receive communications from one or more remote controls that allow a user to interact with television receiver 200. User interface 250 may receive and send received commands to control processor 210a, which may then process the commands using a control engine. In some embodiments, it may be possible to load some or all preferences to a remote control. As such, the remote control can serve as a backup storage device for user preferences. In such embodiments, the communication link with the remote control via user interface 250 is bidirectional. User interface 250 may be configured to receive commands from one or more remote controls. User interface 250 may receive commands via BLUETOOTH, NFC, an IR-implemented protocol, an RF-implemented protocol, or some other communication protocol.

Security device 260, which may be implemented as a smart card, may be used for decrypting incoming data. The decrypted data may be used by descrambling engine 265 for descrambling video and/or audio. Descrambled video and/or audio may be output by descrambling engine 265 to storage medium 225 for storage, such as in DVR database 245, and/or to decoder module 233 for output to a television or other presentation equipment via television interface 235.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

PID filters 255 may be configured to filter data packets based on PIDs. In some embodiments, PID filters 255 are created and executed by tuning management processor 210b. In other embodiments, separate hardware may be used to create and execute such PID filters. Depending on a television channel selected for recording/viewing, a PID filter may be created to filter the video and audio packets associated with the television channel, based on the PID assignments present in PMT 257. For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210b.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer systems disclosed further herein.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely.

Figure 3:
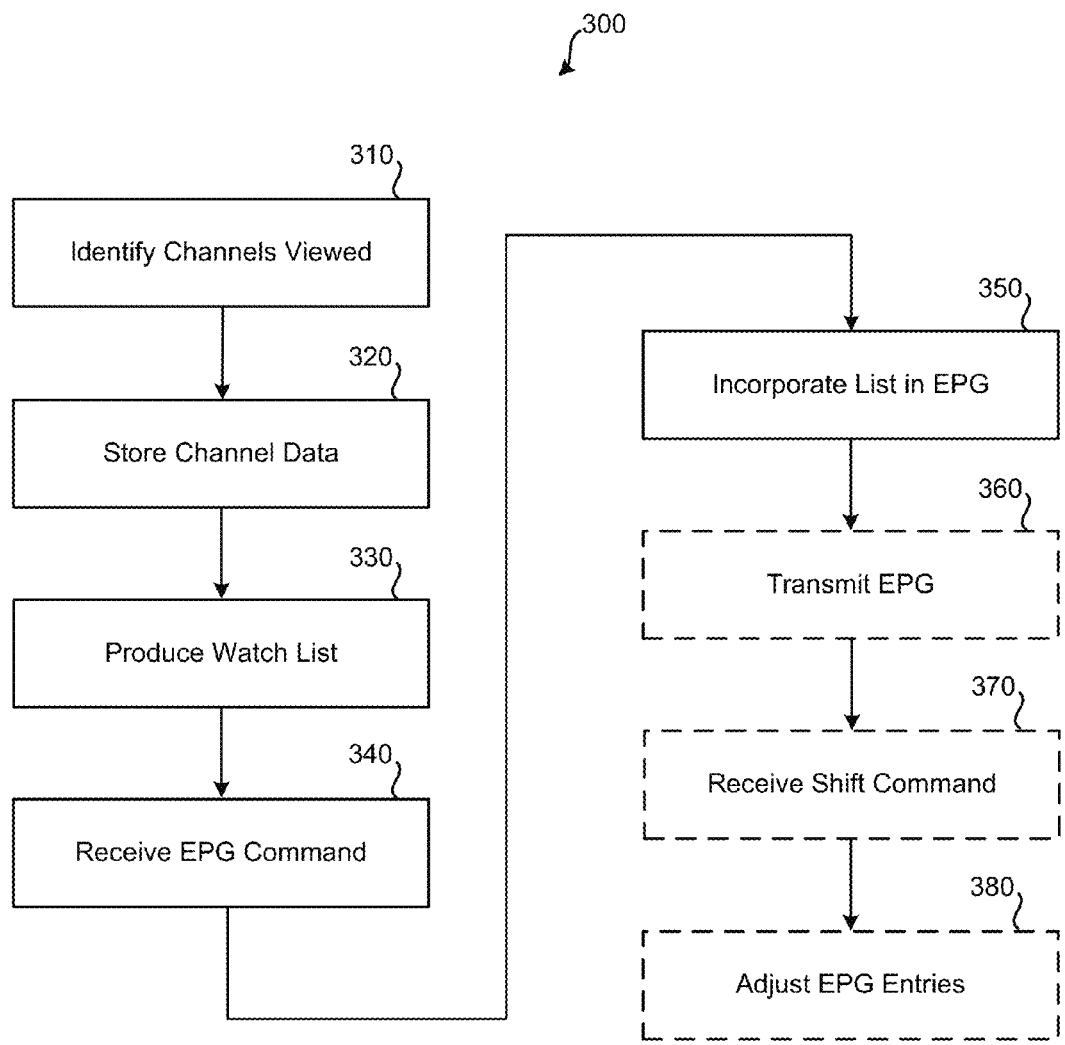
FIG. 3 illustrates a simplified flow diagram of a method for displaying an enhanced program guide according to embodiments of the present technology.

The systems and devices previously described may be used in performing various methods. The methods may also be represented by programming stored in memory of a computing or electronic device. FIG. 3 illustrates an embodiment of a method 300 for producing an enhanced electronic program guide for a user. Method 300 may be performed using any of the systems or components previously described. Method 300 may allow for an electronic device to incorporate channels a user watches most as well as specific user-selected channels into a modified electronic program guide. Each step of method 300 may be performed at or by a single electronic device, such as an STB, DVR, or mobile device, for example, or by multiple devices communicating with one another. Means for performing each step of method 300 include an electronic device and/or the various components of an electronic device or distribution system, such as those detailed in relation to FIGS. 1 and 2. Method 300 may be performed using a computerized device, such as a device incorporating some or all of the components of computer system 600 of FIG. 6.

The electronic device utilized in the technology may be a television receiver or set-top box as previously described, and may include at least one input component configured to receive audiovisual content. This may include broadcast channels, such as local broadcast channels. The electronic device may also include at least one output component communicatively coupled with at least one display device, such as previously described. The electronic device may identify channels viewed by a user over a period of time at operation 310. This may be accomplished by the electronic device in any number of ways. For example, the electronic device may maintain in memory or a database each channel viewed on the device. Any time a channel is selected for viewing, either via a programming guide or by typing in a specific channel number, the electronic device may store data regarding what channel is being watched and for how long. In one non-limiting example, when a user selects a channel and watches a show for thirty minutes, the electronic device may update the data for the particular channel to include an additional access event, the time of day, the program being broadcast, the amount of time the channel is viewed, and any other information that may be collected from the event. Such information may be stored in a database, for example, and the electronic device may produce such a database or populate aspects of the database for each channel viewed at operation 320. The data may be stored in any number of ways and include any number of parameters, including alphabetically listing of channels, ordering by date, time, amount of time per channel, user name, times channel is selected, etc. In one embodiment, the database may include every channel available, and when a specific channel is selected by a user, the information is added to the database, which may be continually updated with time information and channel information. The database may also store similar data for additional on-demand and application based programs as discussed in more detail below.

The electronic device may produce a list of channels utilizing the stored data at operation 330. This list may include some or all channels viewed during the period of time, and may be ordered from the most watched channel to the least watched channel in embodiments. The list may be maintained and updated continuously in embodiments, and may be delivered in conjunction with requests for an electronic program guide. For example, a user may send an instruction or command to the electronic device to provide or display an electronic program guide at operation 340. In response, the electronic device may access, connect with, or otherwise develop the program guide for delivery or presentation to the user. For example, the electronic device may access the electronic program guide or EPG database, as previously described, to produce the program guide with available information about current and future programming. In developing the program guide for transmission, the electronic device may utilize aspects of the EPG database as well as the list in order to develop an enhanced electronic program guide for the user. For example, the electronic device may access the list to retrieve at least a portion of the most-watched channels to determine which channels to include in the produced EPG, and may also access the EPG database to retrieve the specific program information for those channels as well as other channels that may be included in the produced EPG as well.

In disclosed embodiments, the electronic device may incorporate at least a portion of the list into the electronic program guide for display at operation 350. In an embodiment, the electronic device may utilize information obtained with the electronic device via the network interface to produce a modified electronic program guide. While a conventional program guide may include a listing of channels in numerical order only, the present technology may develop an electronic program guide that includes one or more channels from the list produced by the electronic device for use by the user.

The present technology may produce an electronic program guide that includes one or more channels from the list maintained by the electronic device so that a user may have quick access to channels frequently viewed. Conventional program guides contain a limited number of channels per page for viewing by the user. For example, when a user selects a controller entry to view an electronic program guide, the electronic program guide may show the present channel the user is viewing, as well as three, four, five, six, or more channels that are located numerically prior to or subsequent to the present channel. However, if a user is interested in identifying what is being presented on a channel frequently viewed by the user, but that is numerically far from the present channel, the user must scroll by various means in order to view what is being presented on that channel. For example, many television remote controls include both channel up/down buttons as well as page up/down buttons. With hundreds of channels of viewing selections, though, a user may need to view dozens of pages of program guide to identify programs on particular channels. The electronic device, which may for example be or include a television receiver, may update the electronic program guide utilizing data from the EPG database previously discussed.

In embodiments of the present technology, the electronic program guide may be developed by the electronic device to incorporate channels from the list of frequently watched channels stored, maintained, and updated on the electronic device. The electronic device may generate aspects of the electronic program guide in a similar fashion as described above, but may not be bound by the conventional channel listings in the guide, and instead may develop a much more user friendly guide. The electronic program guide may be developed to include only items from this list when a command to present the guide is initially delivered, or the program guide may be developed to include some items from this list as well as additional items from the standard electronic program guide. Once the enhanced program guide is produced, the electronic device may transmit the electronic program guide for display on a communicatively coupled display device at optional operation 360. The user may then view the program guide on the display device, and interact with it utilizing a remote control or other interactive tool to provide commands to the electronic device. As will be explained in greater detail below, the electronic device may receive a command from the user to shift the entries in the electronic program guide at optional operation 370, and may in response adjust the program guide entries at optional operation 380.

The list developed by the electronic device may be continuously updated whenever the electronic device is in use and may modify the most watched channels accordingly on what channels are being watched and by whom. The list may be updated by a comparison of the present list and order parameters with the most-current information in the database of channel information described above. The list order may be based on multiple metrics including the number of times during the period of time that each channel was accessed, or on the cumulative amount of time during the period of time that each channel was accessed. In embodiments, each user may determine which metric is used for their list. For example, a user may watch a movie channel less frequently, but for longer times than a twenty-four hour news channel, and this difference may be reflected in the list of most watched channels for the user. The user may determine whether he is more interested in having channels displayed that he frequents more often, or channels that he spends more time watching. A combination may be utilized as well where the list is ordered to include the most watched program by each metric, such as the list includes the most frequently accessed channel, then the longest watched channel, then the second most frequently accessed channel, etc., as well as other variations of this concept, which are equally applicable and similarly encompassed by the present technology.

The enhanced electronic program guide provided for display to the user may initially include only items from the frequently viewed channel list developed by the electronic device, and may include the number of items on the list matching the available slots per page of the electronic program guide interface. When the user utilizes a shift command, such as a page down command, the electronic device may then present the next page's worth of channels in the order they appear on the list. For example, if a page of the electronic program guide displays seven channels, when a user accesses the program guide, the seven most watched channels may initially be displayed. When the user pages down, the next seven most watched channels may be displayed. The list may be ordered from the most watched channels to the least watched channels in various embodiments, and may also be a list personal to each individual user of the electronic device in disclosed embodiments.

The user may be one of a number of users recognized by the device in embodiments, and the list developed by the electronic device may be a user list produced for that user based on channels viewed by that user. For example, in a household having more than one user of the electronic device, each user may have different channels that they watch most frequently. For example, while an adult may have a news program be their most watched channel, a child may have a cartoon channel or children's learning channel be their most watched channel. The electronic device may be configured to produce different lists for different users in various embodiments. Multiple users may be tracked as additional parameters in the database, for example. Additional parameters populated in the database may include— along with the other information collected per viewing event—the identity of the user watching. In this way, personal lists may be developed based on the personal information collected for each user, and hence personal enhanced electronic program guides may be provided for every individual recognized and tracked by the system.

The electronic device may recognize a user by a variety of mechanisms. The device may utilize a login feature or a selection option of the available users in order to determine in which list a particular channel should be tracked. The electronic device may then monitor the viewing habits of each user separately to produce frequently watched lists that are particular to the channels watched by each user. In this way, a user may avoid frustration of not being able to monitor his personal favorite channels as most frequently watched because another person who may utilize the device more frequently and access a larger assortment of channels has overpopulated the list with their viewing habits.

The period of time for which the list is produced may include any available amount of time, from hours, to days, weeks, months, years, up to the initiation of the device use. A user may adjust these settings in various embodiments based on changing viewing habits and may command the electronic device to produce the list based on any amount of time. For example, a user may access a settings menu to select that the list is produced based on the last 1, 2, 3, 4, 5, 6, 7, 8, 10, 20, 26, 52, etc. weeks or more—or any intervening or other value, which alternatively may be hours, days, years, etc., and may continue to adjust the list on a rolling basis. The electronic device may store data since the initiation of the unit use and continuously populate the database, but may only utilize data during the selected time period in order to produce the most frequently watched channels list. In this way, a user's evolving viewing habits may be taken into account to produce the most useful list to the user. Thus, if a user watched a program every day or week for a period of time such that the channel became a frequently watched channel, but then the show is canceled, the list may be updated on the selected rolling basis to reflect this change. This way, the user is not shown options for channels that are no longer or not currently the most frequently watched, even if the channel was once watched to such a degree that based on how the list is ordered may still rank above channels that are being watched currently. Additionally, in embodiments a user may actively remove channels from the most-watched list as well.

Moreover, the list may not be limited to only listed broadcast channels, and a user may be able to include non-standard programming options in the list as well. For example, an electronic device may be a gateway to additional applications including on-demand programming, and additional applications including online applications, movie and series applications, as well as additional electronic devices included in the user system. The electronic device may record statistics for these other options as well, and such options may be included in the list provided with the electronic program guide. Hence, based on the frequency of access, an entry on the accessed program guide may include a position developed for access to this additional material. The electronic device may include a user-selectable link within one of the list entries that when selected by the user will transfer the user to this additional application. The system may be further designed to allow input switching for sound systems or other adjustments so that when the alternate device or application is selected, the system configuration may be adjusted accordingly.

Additionally, not only channels may be included in the list, but specific programs as well based on these other applications. As many broadcast providers allow access through on-demand content to watch regularly broadcast programs, the electronic device may be configured to recognize that a user is less interested in a specific channel than in a particular program provided on that channel. The data collected by the electronic device may include the program title, actor information, etc., and the electronic device may monitor when new episodes of a program a user consistently watches are available. Based on the frequency watched, or based on a user command to include this additional information in a program guide slot regardless of the amount watched, the program guide may include an option to access the new program when available. The electronic device may update the list to include this material only when a new episode is available, and at other times include other user-selectable or frequency based channels in the program guide slots, as well as standard channel entries as well.

In embodiments, the electronic program guide includes multiple slots and entries per page, and any number including none, some, or all of the entries may include channels from the list maintained by the electronic device. For example, half of the entries may include selections from the list, while the remaining entries include standard listings including the programs for the channel currently being displayed, and the channels surrounding that particular channel.

A selection may also be available in the program guide allowing a user to adjust the electronic program guide and various settings of the display. For example, the setting may include adjusting the number of listings presented per page from the list as well as those from the standard program guide information. Users may be able to switch between a standard program guide and the enhanced program guide including list entries for most watched channels. Users may also include favorite channels that may be permanently stored on a specific position on the list regardless of the amount watched during the time period. In this way, a user may maintain a favorite channel as being always available to see what is being broadcast even if the user does not frequently view the channel enough to otherwise have the channel appear on the list. For example, a user may include locally broadcast channels including major broadcast channels in the list at all times by utilizing this option. Accordingly, the user may set up the program guide to include a number of entries from the list, a number of standard channel entries, as well as user specified channels or applications. In this way, the user may fully customize the enhanced electronic program guide to fit his needs.

When the electronic program guide includes multiple types of entries as explained above, movement through the program guide may be adjusted as well. For example, a user may be viewing the program guide, which includes multiple entries from the list developed by the electronic device, as well as multiple entries from the standard program guide. The user may have a selector or cursor over a particular entry from the list entries, and wish to see additional programs being displayed on different programs from the list. The user may then issue a command to the electronic device, such as a channel down or page down command, to shift the displayed entries on the electronic program guide. In response, the electronic device may adjust the entries of some or all of the slots of the displayed program guide, and may adjust entries for one portion of the guide while maintaining the other entries on the electronic program guide. This will be explained in further detail with FIG. 5 below.

Turning to FIG. 4 is illustrated an exemplary program guide 400 according to embodiments of the present technology. Box 402 may be one of several sized objects including the entire display device screen, or a portion of the screen. For example, outline 402 may include a portion of the display, such as more or less or about the bottom half of a display device screen space for example, where description information and/or currently accessed channel programs may be displayed elsewhere on the screen. Electronic program guide entries 404 may be populated on the display by the electronic device. As illustrated, the entire number of displayed slots include items from the most frequently watched list maintained by the electronic device, although in embodiments only a portion of the entries may be from the list as explained elsewhere in the application.

A title of the line entry 406 may be included to aid user identification of which channels listed comprise list entries, and which channels are from a separate source such as standard program guide entries including the currently accessed channel and its surrounding channels, e.g. the channels numerically closest above or below that current channel. Additionally, the channel listing 408 itself may be included either as the channel number and/or station title to further aid the user in identifying the channels being included in the EPG. As illustrated in the figure, certain entries include access to on-demand programming that a user frequents or has specified to be included in the EPG, as well as an entry by the electronic device notifying a user that a favorite program has a new episode available to watch on demand as well. Were the new episode not available, the electronic device may alternatively have populated that position with the next-most-watched channel as determined by the electronic device.

Figure 5A:
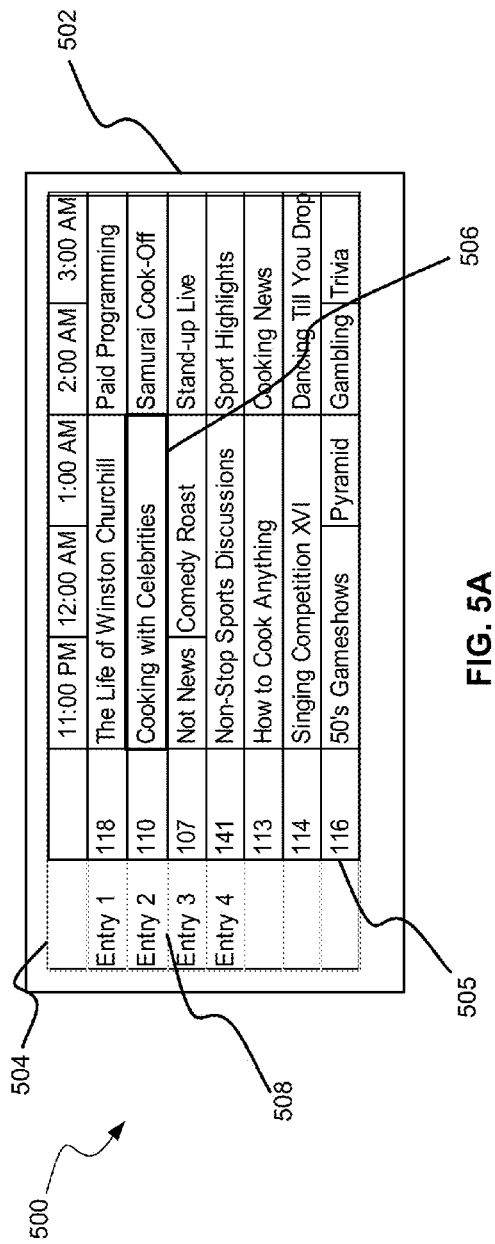
FIGS. 5A-B show simplified electronic program guides according to embodiments of the present technology.
Figure 5B:
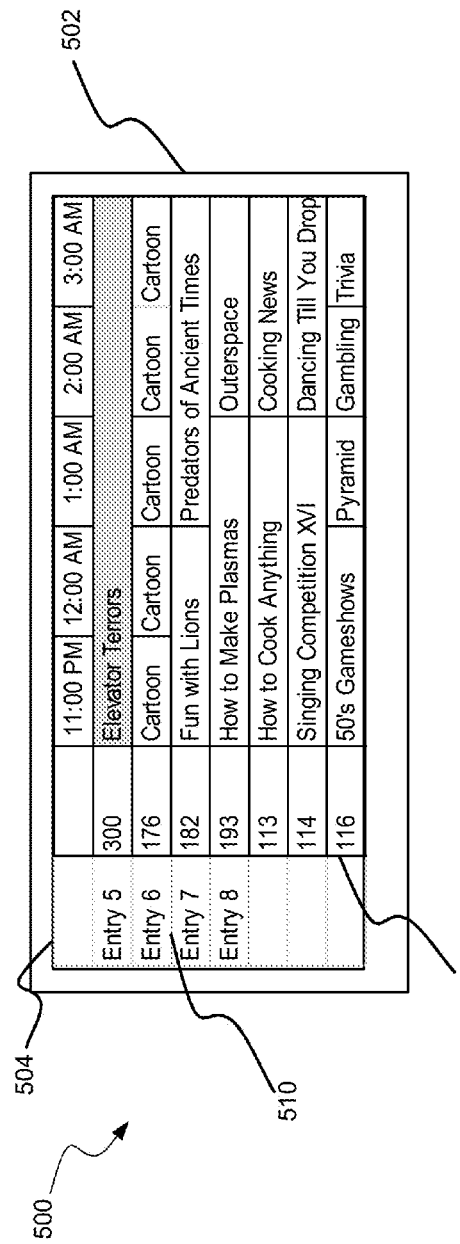

FIGS. 5A-5B illustrate additional electronic program guides 500 according to the present technology. Similar to that of FIG. 4, box 502 may be of any portion of an available display area from the entire display screen to a portion of the screen. FIG. 5A illustrates an additional enhanced electronic program guide area 504 that includes portions dedicated to both channels of a user's most watched items 508 as well as regular listings of channels 505 that may be based on the user currently having the channel number 113 or 114 being presented on the display, for example. As illustrated, the user may be viewing a page of the electronic program guide and currently has the selector or cursor on a listing 506 for channel 110, which is one of the user's most watched channels. If the user is interested in viewing additional most-watched channels, the user may provide a command to the electronic device, such as with the user remote control for example, to page down to additional listings. As a result, the electronic device accesses the next four listings from the most-watched selections, and repopulates that area of the electronic program guide with the next four entries 510. Notably in FIG. 5B, the channels that are not part of the most-watched listings have not shifted by the electronic device, although the user may place the cursor in that region, for example, and perform a similar operation to adjust those listings without adjusting the most-watched entries listed.

In embodiments, both sets of entries may be adjusted simultaneously as well. For example, if a user pages down or utilizes directional keys to move the cursor down, both sections of entries may be adjusted to the next available listings of the respective sets, as well as horizontal movements may adjust the program time being viewed for all listings simultaneously. Additionally, if a user has preset selections of channels that should always be included in the electronic device list, these selections may adjust similarly with the other entries or even on their own process. For example, if the first entry is a channel that the user has defined to be in the list, the electronic device may adjust this entry during the previously described operations to adjust to one of the list entries, an additional user-selected entry, or a standard entry in embodiments.

Figure 6:
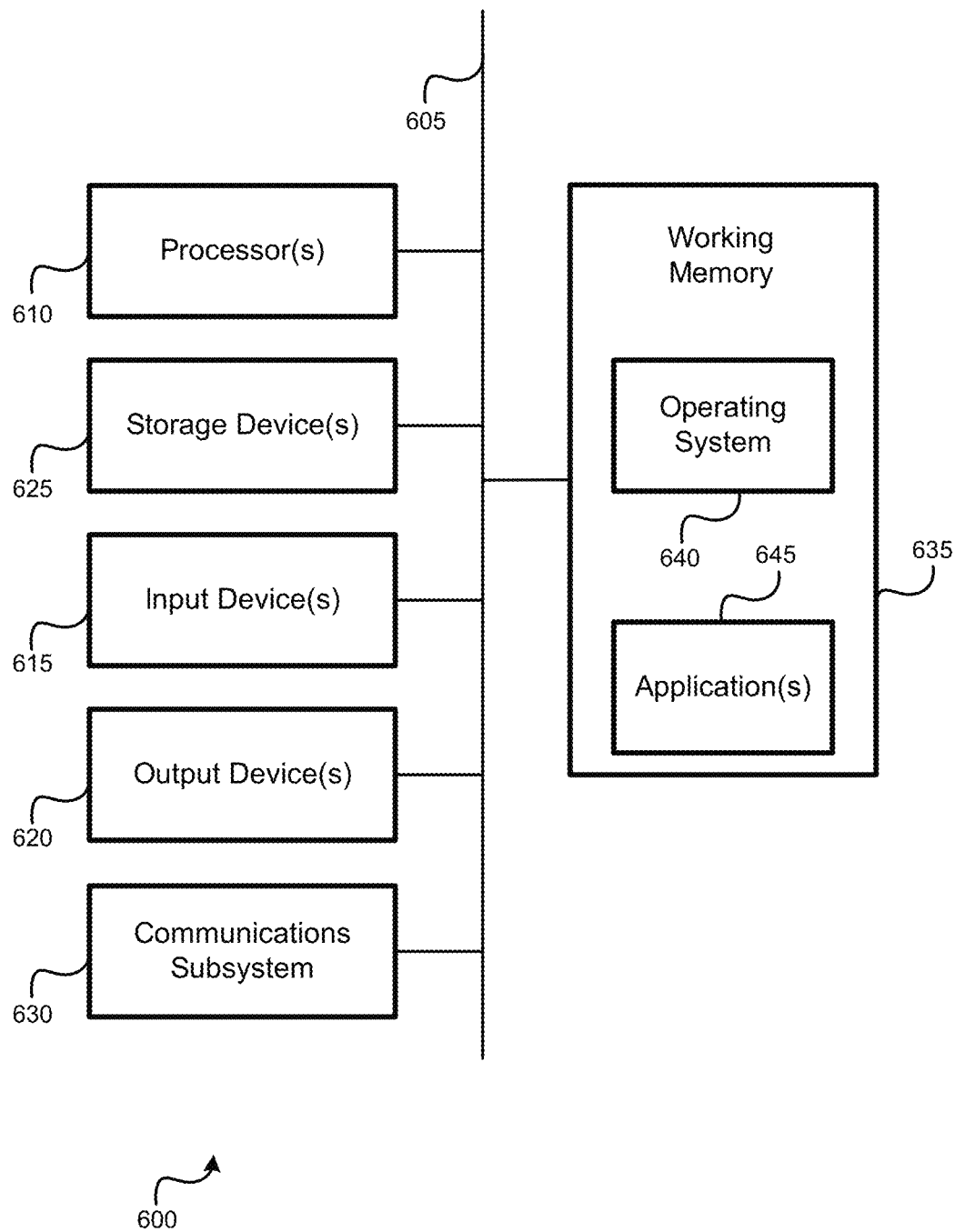
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 3, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of displaying a customized program guide with an electronic device, the method comprising:
   identifying at the electronic device each channel viewed by a user over a period of time;
   storing, at the electronic device, data associated with each channel viewed;
   generating, at the electronic device, a list including a plurality of previously watched channels based on the stored data, wherein the list of previously watched channels is ordered from most watched channel to least watched channel;
   receiving, at the electronic device, a command to display an electronic program guide;
   determining, at the electronic device, a first subset of channel entries to display within the electronic program guide, the first subset of channel entries including channel entries corresponding to a channel currently being output for display and at least one channel surrounding the channel currently being output for display;
   determining, at the electronic device, a second subset of channel entries to display within the electronic program guide, the second subset of channel entries including a plurality of channel entries corresponding to a first plurality of the most watched channels from the ordered list of previously watched channels;
   outputting, by the electronic device, the electronic program guide for display, wherein the electronic program guide comprises the determined first subset and the determined second subset of channel entries within a single grid of channel entries;
   receiving at the electronic device a second command to shift the displayed entries of the electronic program guide; and
   in response to the second command to shift the displayed entries of the electronic program guide:
      determining an updated first subset of channel entries, the updated first subset of channel entries including channel entries corresponding to a set of channels adjacent to the first subset of channels entries;
      determining an updated second subset of channel entries, the updated second subset of channel entries including channel entries corresponding to a second plurality of the next most watched channels from the ordered list of previously watched channels; and
      updating the display of the electronic program guide, wherein the updated display of the electronic program guide comprises the updated first subset of channel entries and the updated second subset of channel entries within the single grid of channel entries, and wherein the updated first subset of channel entries and the updated second subset of channel entries are displayed within the electronic program guide simultaneously in response to the second command.

2. The method of claim 1, further comprising transmitting from the electronic device the electronic program guide for display on a communicatively coupled display device.

3. The method of claim 1, wherein the user comprises one of a plurality of users recognized by the electronic device, and wherein the ordered list of previously watched channels comprises a user list produced for that user based on channels viewed by that user.

4. The method of claim 1, wherein the list of previously watched channels comprises access to on-demand programming.

5. The method of claim 1, wherein the ordered list of previously watched channels is ordered based on the number of times during the period of time that each channel was accessed.

6. The method of claim 1, wherein the ordered list of previously watched channels is ordered based on the cumulative amount of time during the period of time that each channel was accessed.

7. The method of claim 1, further comprising:
   accessing the list of previously watched channels to retrieve at least a subset of the most-watched channels on the list; and
   accessing an electronic program guide data table to retrieve information regarding channels including the retrieved subset of most-watched channels on the list.

8. The method of claim 1, wherein the electronic program guide comprises at least four entries per screen for display, and wherein at least half but not all of the entries are from the second subset of channel entries.

9. The method of claim 1, wherein the electronic program guide includes a selection option to allow a user to display a standard channel order by removing the second subset of channel entries from the electronic program guide.

10. The method of claim 1, wherein the electronic program guide includes at least one channel selected by the user to be initially displayed in the electronic program guide regardless of whether the channel is in the list of previously watched channels.

11. An electronic device comprising:
at least one output communicatively coupled with at least one display device;
one or more processors; and
memory communicatively coupled with and readable by the one or more processors and having stored therein processor-readable instructions, which when executed by the one or more processors cause the one or more processors to:
identify each channel viewed by a user over a period of time;
store data associated with each channel viewed;
generate a list of a plurality previously watched channels based on the stored data, wherein the list of previously watched channels is ordered from most watched channel to least watched channel;
receive a command to display an electronic program guide;
determine a first subset of channel entries to display within the electronic program guide, the first subset of channel entries including channel entries corresponding to a channel currently being output for display and at least one channel surrounding the channel currently being output for display;
determine a second subset of channel entries to display within the electronic program guide, the second subset of channel entries including a plurality of channel entries corresponding to a first plurality of the most watched channels from the ordered list of previously watched channels;
output the electronic program guide for display, wherein the electronic program guide comprises the determined first subset and the determined second subset of channel entries within a single grid of channel entries;
receive a second command to shift the displayed entries of the electronic program guide; and
in response to the second command to shift the displayed entries of the electronic program guide:
determine an updated first subset of channel entries, the updated first subset of channel entries including channel entries corresponding to a set of channels adjacent to the first subset of channels entries;
determine an updated second subset of channel entries, the updated second subset of channel entries including channel entries corresponding to a second plurality of the next most watched channels from the ordered list of previously watched channels; and
update the electronic program guide, wherein the updated electronic program guide displays the updated first subset of channel entries and the updated second subset of channel entries within the single grid of channel entries, and wherein the updated first subset of channel entries and the updated second subset of channel entries are displayed within the electronic program guide simultaneously in response to the second command.

12. The electronic device of claim 11, wherein the processors are further caused to transmit the electronic program guide for display on the at least one display device.

13. The electronic device of claim 11, wherein the ordering of the list of previously watched channels is based on the number of times during the period of time that each channel was accessed.

14. The electronic device of claim 11, wherein at least five channels of the list of previously watched channels are incorporated into the electronic program guide.

15. The electronic device of claim 11, wherein the user comprises one of a plurality of users recognized by the electronic device, and wherein the ordered list of previously watched channels comprises a user list produced for that user based on channels viewed by that user.

16. A non-transitory computer-readable medium with sets of instructions thereon, which when executed by a processor cause the processor to:
identify each channel viewed by a user over a period of time;
store data associated with each channel viewed;
generate a list of a plurality of previously watched channels based on the stored data, wherein the list of previously watched channels is ordered from most watched channel to least watched channel;
receive a command to display an electronic program guide;
determine a first subset of channel entries to display within the electronic program guide, the first subset of channel entries including channel entries corresponding to a channel currently being output for display and at least one channel surrounding the channel currently being output for display;
determine a second subset of channel entries to display within the electronic program guide, the second subset of channel entries including a plurality of channel entries corresponding to a first plurality of the most watched channels from the ordered list of previously watched channels;
output the electronic program guide for display, wherein the electronic program guide comprises the determined first subset and the determined second subset of channel entries within a single grid of channel entries;
receive a second command to shift the displayed entries of the electronic program guide; and
in response to the second command to shift the displayed entries of the electronic program guide:
determine an updated first subset of channel entries, the updated first subset of channel entries including channel entries corresponding to a set of channels adjacent to the first subset of channels entries;
determine an updated second subset of channel entries, the updated second subset of channel entries including channel entries corresponding to a second plurality of the next most watched channels from the ordered list of previously watched channels; and
update the electronic program guide, wherein the updated electronic program guide displays the updated first subset of channel entries and the updated second subset of channel entries within the single grid of channel entries, and wherein the updated first subset of channel entries and the updated second subset of channel entries are displayed within the electronic program guide simultaneously in response to the second command.

17. The computer-readable medium of claim 16, wherein the processors are further caused to transmit the electronic program guide for display on the at least one display device.

18. The computer-readable medium of claim 16, wherein the electronic program guide includes at least one channel selected by the user to be initially displayed in the electronic program guide regardless of whether the channel is in the list of previously watched channels.

19. The computer-readable medium of claim 16, wherein the electronic program guide includes a selection option to allow a user to adjust the electronic program guide to include one or more channel entries from the second subset of channel entries, currently displayed channels or channels numerically proximate a currently displayed channel, or user-selectable channels.

20. The computer-readable medium of claim 16, wherein the user comprises one of a plurality of users associated with the stored data, and wherein the ordered list of previously watched channels comprises a user list produced for that user based on channels viewed by that user.

\* \* \* \* \*